United States Patent
Simmons

(10) Patent No.: US 10,766,436 B2
(45) Date of Patent: Sep. 8, 2020

(54) DEVICE TO ELIMINATE PHYSICAL AND/OR VERBAL EXCHANGES DURING A TRAFFIC STOP

(71) Applicant: Anthony Simmons, St. Clair Shores, MI (US)

(72) Inventor: Anthony Simmons, St. Clair Shores, MI (US)

( * ) Notice: Subject to any disclaimer, the term of this patent is extended or adjusted under 35 U.S.C. 154(b) by 0 days.

(21) Appl. No.: 16/751,426

(22) Filed: Jan. 24, 2020

(65) Prior Publication Data

US 2020/0238927 A1 Jul. 30, 2020

Related U.S. Application Data

(60) Provisional application No. 62/918,412, filed on Jan. 25, 2019.

(51) Int. Cl.
*B60R 13/10* (2006.01)
(52) U.S. Cl.
CPC .................................. *B60R 13/10* (2013.01)
(58) Field of Classification Search
CPC .......... B60R 13/10; G09F 3/201; G09F 3/203
See application file for complete search history.

(56) References Cited

U.S. PATENT DOCUMENTS

| | | | | |
|---|---|---|---|---|
| 4,844,311 A | * | 7/1989 | Kalen | B60R 7/05 224/312 |
| 4,889,268 A | * | 12/1989 | Shubeck | B60R 13/00 224/277 |
| 6,349,491 B1 | * | 2/2002 | Able | G09F 1/10 40/124.01 |
| 7,571,560 B2 | * | 8/2009 | Peterman | G09F 1/10 24/336 |
| 2018/0151093 A1 | * | 5/2018 | Willis | G09F 3/203 |
| 2019/0077325 A1 | * | 3/2019 | Boukari | B60R 7/08 |

\* cited by examiner

*Primary Examiner* — Gary C Hoge
(74) *Attorney, Agent, or Firm* — Christopher P. Maiorana, PC

(57) ABSTRACT

An apparatus includes a plate, a securing mechanism and a plurality of pouches. The plate may have a top, a bottom, a front face, and a back face. The securing mechanism may be connected to the top of the plate. The securing mechanism may be configured to attach to a glass window of a vehicle. The plurality of pouches may be connected to the front face. The pouches may be configured to hold physical identification documents. The plate is configured to rest flush with the glass window when the glass window is rolled up. The apparatus allows the physical identification documents to be presented during a traffic stop without the need to verbally and physically interact with a police officer.

12 Claims, 5 Drawing Sheets

DEVICE TO ELIMINATE PHYSICAL AND/OR VERBAL EXCHANGES DURING A TRAFFIC STOP

This application relates to U.S. Provisional Application No. 62/918,412, filed Jan. 25, 2019, which is hereby incorporated by reference in its entirety.

FIELD OF THE INVENTION

The invention relates to improving traffic stop interactions generally and, more particularly, to a method and/or apparatus for implementing a device to eliminate physical and verbal exchanges during a traffic stop.

BACKGROUND

A traffic stop is referred to as a time when a law enforcement officer (such as a state trooper, local police officer, or other law enforcement representative) asks (or demands) that a vehicle pull out of active traffic for either a traffic violation, or some other sort of potential violation. Drivers are often apprehensive when being pulled over for a traffic stop. Some drivers feel they are unjustly targeted for traffic stops.

Many traffic stops become contentious. A contentious traffic stop can result in yelling, threatening, physical violence, and even death. Since a driver and an officer traditionally physically and/or verbally interact, the chances of a contentious traffic stop increase.

It would be desirable to implement a device to eliminate physical and/or verbal exchanges during a traffic stop.

SUMMARY

The invention concerns a plate, a securing mechanism and a plurality of pouches. The plate may have a top, a bottom, a front face, and a back face. The securing mechanism may be connected to the top of the plate. The securing mechanism may be configured to attach to a glass window of a vehicle. The plurality of pouches may be connected to the front face. The pouches may be configured to hold physical identification documents. The plate is configured to rest flush with the glass window when the glass window is rolled up. The apparatus allows the physical identification documents to be presented during a traffic stop without the need to verbally and physically interact with a police officer.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a device that may (i) eliminate physical and/or verbal exchanges during a traffic stop and/or (ii) be implemented using one or more types of holders.

Figure 1:
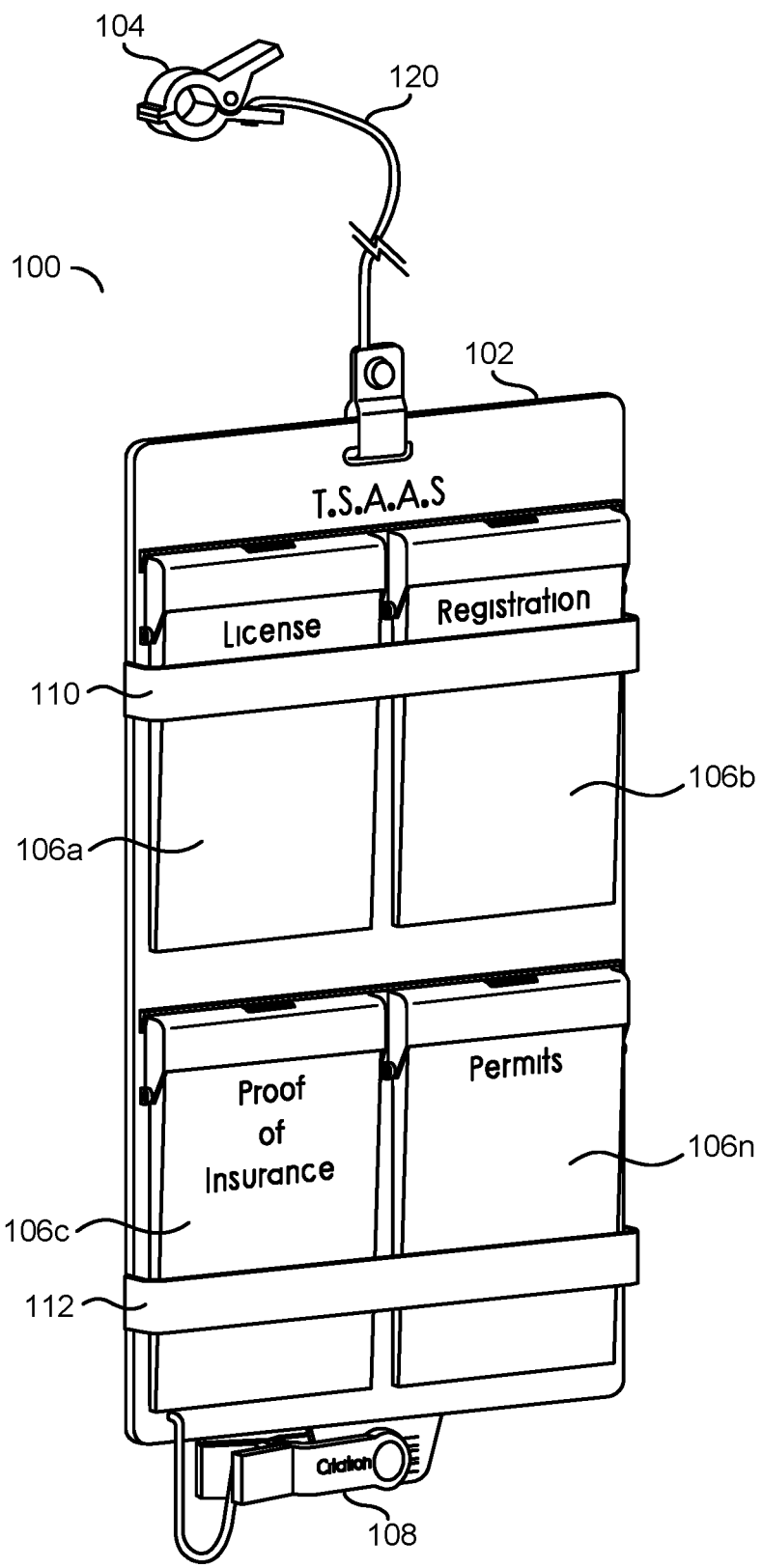
FIG. 1 is a diagram of an apparatus according to an aspect of the invention.

Referring to FIG. 1, a block diagram of an apparatus 100 according to an aspect of the invention is shown. The apparatus 100 generally comprises a plate 102, a securing mechanism 104 and a plurality of pouches 106a-106n. A securing mechanism 108 may also be implemented. The pouches 106a-106n (or holders) may be configured to hold physical identification documents. For example, the pouch 106a may hold a drivers license. The pouch 106b may hold the registration for a vehicle. The pouch 106c may hold the proof of insurance for a vehicle. The pouch 106n may hold other documents, such as a permit to carry a gun. A strap 110 and a strap 112 are also shown. The straps 110 and/or 112 may secure the apparatus 100 to the vehicle. For example, the straps 110 and/or 112 may be used to stretch around a sun visor of the vehicle, when the apparatus is not in use. The straps 110 and/or 112 may be, in one example, an elastic material.

The securing mechanism 104 may be implemented as a clip, a suction cup, or other type of securing mechanism. The securing mechanism 104 may be configured to allow the plate 102 to rest flush with a glass window of a vehicle (not shown, to be described in more detail in connection with FIG. 5) when the glass window is rolled up.

Figure 2:
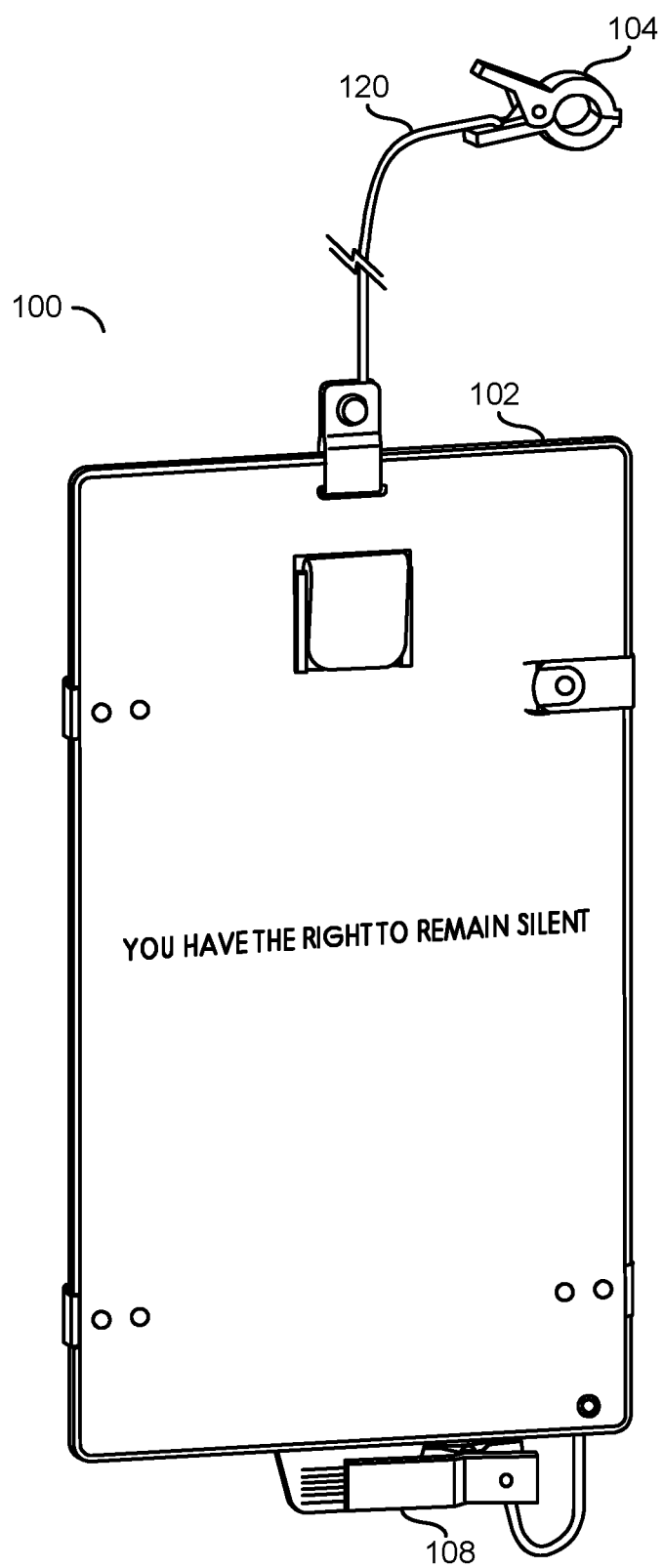
FIG. 2 is a diagram of a back side of the apparatus of FIG. 1.

Referring to FIG. 2, a block diagram of a back side of the apparatus 100 of FIG. 1 is shown. The securing mechanism 104 is shown connected to the plate 102 with an attachment device 120. The attachment device 120 may be a string, a cord, a wire, or other flexible or semi-flexible material connecting the securing mechanism 104 to the plate 102.

Figure 3:
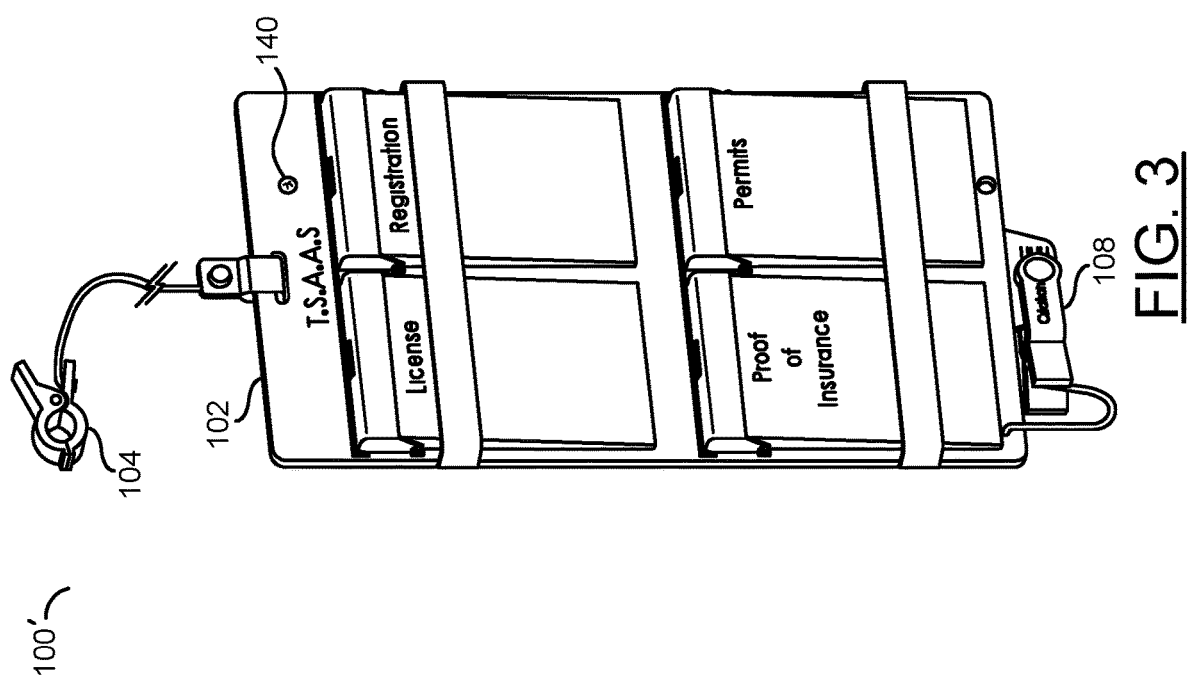
FIG. 3 is a diagram of an alternate implementation.

Referring to FIG. 3, a block diagram of an alternate implementation of an apparatus 100' is shown. The apparatus 100' includes a hole 140. The hole 140 may be implemented as a viewing hole. The hole 140 may allow a camera (to be described in more detail in connection with FIG. 4) to be mounted on the back side of the plate 102. The camera may be configured to capture video of a surrounding area without a subject of the video recognizing the device is being used. In particular, the camera may be mounted to the back side of the apparatus 100', with a view through the hole 140. The camera may be lightweight, and therefore be difficult for a person, such as a patrol officer, who picks up the apparatus 100' to recognize any potential additional weight.

Figure 4:
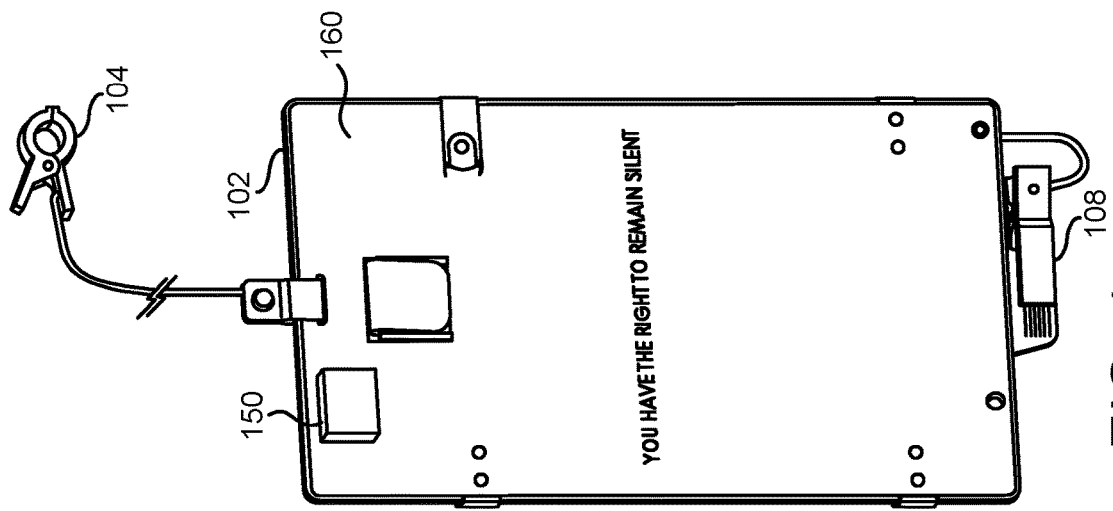
FIG. 4 is a diagram of a back side of the apparatus of FIG. 3.

Referring to FIG. 4, a block diagram of a back side 150 of the apparatus 100' of FIG. 3 is shown. A camera 150 is shown connected to the back side of the plate 102. The camera 150 may be implemented as a portable lightweight camera. The camera 150 may include a lens, processor, battery, input/output section, memory storage, and other electronics used to capture video of an area surrounding a vehicle. For example, the camera 150 may be configured to capture video of the actions of a police officer during a traffic stop. Such video is often more useful when a police officer is unaware of the presence of the camera 150. The camera 150 may be lightweight and/or battery powered. In an example, the camera 150 may have a Wi-Fi antenna that may be configured to transmit video data to a smart phone (not shown) of an operator vehicle. In another example, the video may be transmitted to a dash cam of the vehicle. In another example, the camera 150 may include internal storage to hold the video.

Figure 5:
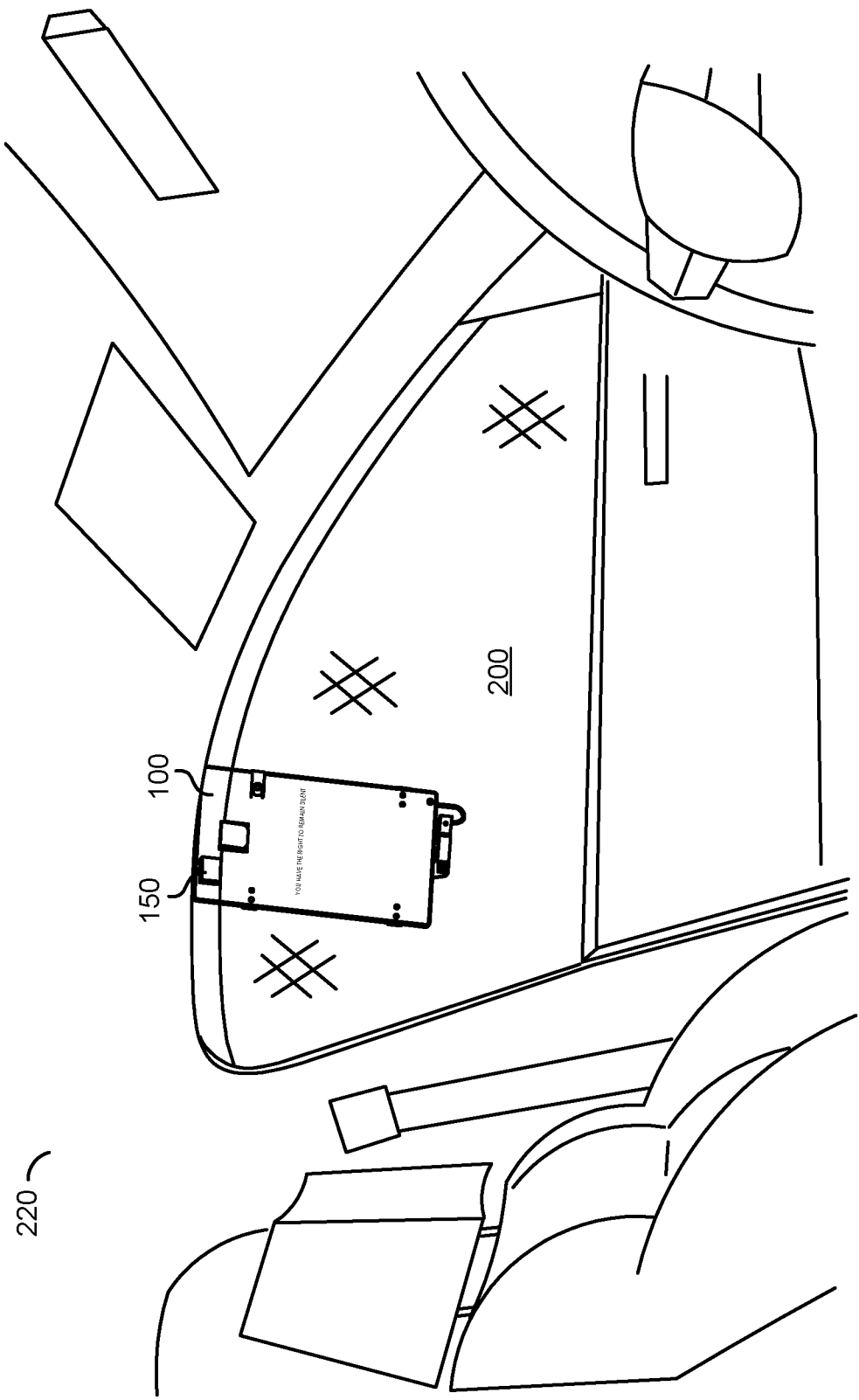
FIG. 5 is a diagram showing the apparatus on a side window of a car.

Referring to FIG. 5, a block diagram showing the apparatus 100 on a side window 200 of a vehicle 220 is shown. The vehicle 220 may be implemented as a car, a truck, or other motor vehicle typically operated on a road that may require routine traffic monitoring. The apparatus 100 and/or 100' may allow such traffic stops to be legally sufficient, while minimizing talking between an officer and a driver.

Figure 6:
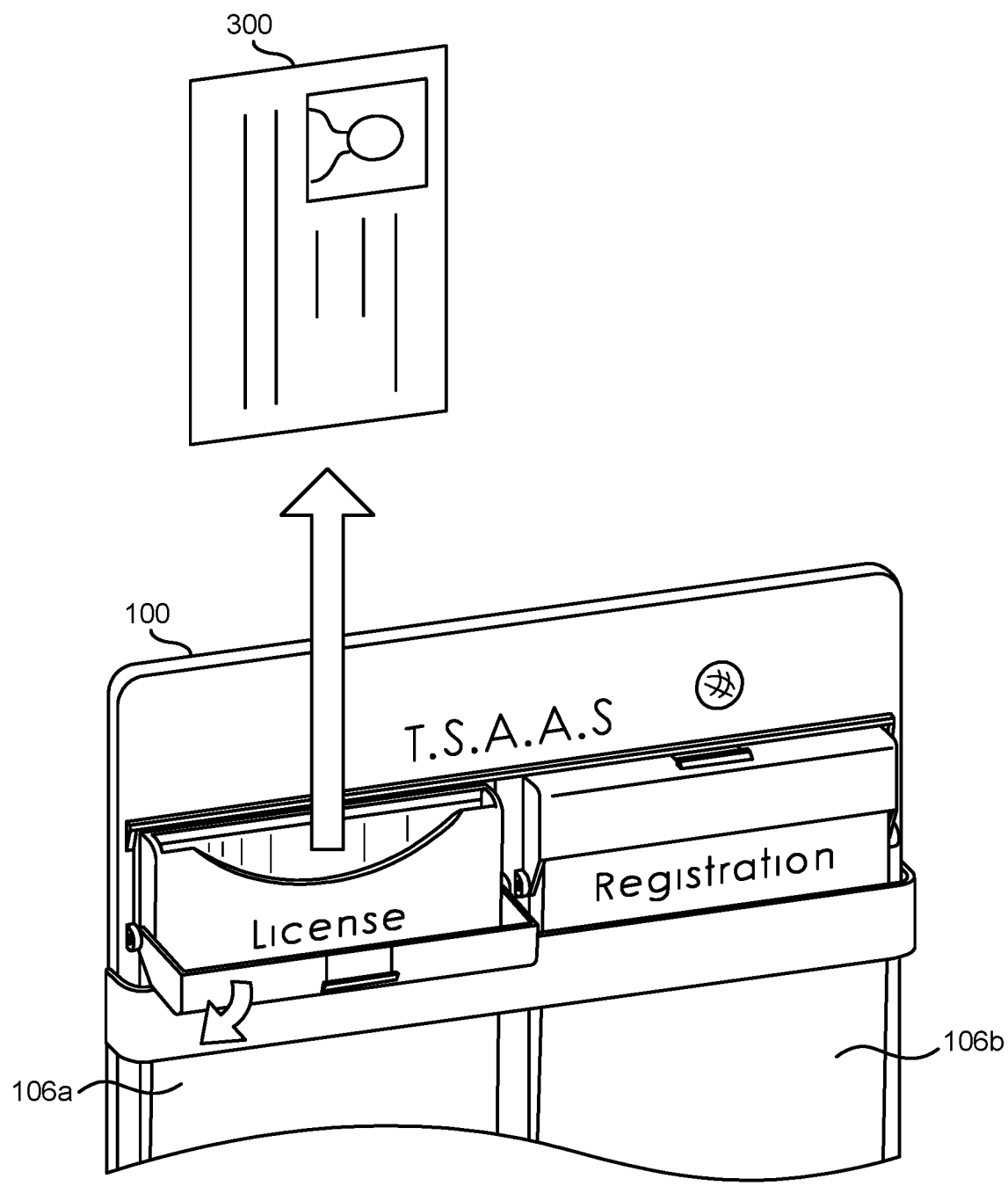
FIG. 6 is a diagram showing the removal of a license from the apparatus.

Referring to FIG. 6, a block diagram showing the removal of a license 300 from the apparatus 100 and/or 100' is shown. The license 200 is generally stored in the pouch 106*a*. When the license 300 is removed, an officer may inspect the license. After inspection, the officer may replace the license into the pouch 106*a*. The pouch 106*c* may be a similar pouch configured to hold the registration of a vehicle. While the pouch 106*a* is labeled license and the pouch 106*b* is labeled registration, the particular order of the labeling of the pouches 106*a*-106*n* may be varied to meet the design criteria of a particular implementation.

The apparatus 100 may act as an extension of driver and/or passenger during a traffic stop. The apparatus 100 may allow a driver and/or one or more passengers to display identification and/or relevant documents on the vehicle window 200 for an officer to retrieve without any verbal and/or physical contact.

The apparatus 100 may allow a driver and/or passenger to identify themselves during a traffic stop while maintaining minimal interaction with officer. The apparatus 100 may be placed on the window 200 from inside the vehicle 220, by rolling down the window 200, attaching the apparatus 100 to the window 200, then rolling up the window 200. After the window 200 is rolled up, the apparatus 100 is generally exposed on the outside of the window 200. The apparatus 100 may allow a police officer to remove relevant documents from one or more of the pouches 106*a*-106*n*. Such documents may include physical identification documents (e.g., paper or laminated documents). Identification documents may include a driver's license, a vehicle registration, proof of insurance for a vehicle, and/or any relevant permits. Permits may include such as documentation as a permit to Cary a Concealed Weapon (CCW), a prescription for tinted windows, or other document a police officer may reasonably need during a traffic stop. After retrieving the documents from the apparatus 100, the officer may then proceed back to the patrol car. Upon returning, the officer may return the documents back to the pouches 106*a*-106*n* of the apparatus 100. If needed, the officer may also attach citations to the apparatus 100 using the clip 108. Once the documents are returned to the pouches 106*a*-106*n* of the apparatus 100, a driver may roll down the window 200, retrieve the apparatus 100, then reattach the apparatus 100 to the inside of the vehicle 220.

An apparatus 100 may allow drivers and/or passengers of the vehicle 220 to exercise their fifth amendment right to remain silent, yet still identify themselves to satisfy requirement of a traffic stop. In particular, the apparatus 100 may provide a legally sufficient presentation of a license, registration, proof of insurance and/or permits. The individually labeled spaces on the pouches 106*a*-106*n* may streamline identification during a stop. To avoid making sudden moves during a traffic stop, the identification documents are generally first placed into the pouches 106*a*-106*n* of the apparatus 100 upon entering the vehicle 220. The identification documents are held in pouches 106*a*-106*n*. The pouches 106*a*-106*n* may be implemented in a variety of ways, such as sleeves, clips/clamps, snaps, zips, buttons, hooks, glue, magnet, band, bands/connector/tack, string/pin/adhesive, tape/pouch, metal, wood, a stick, and/or a rail. During a traffic stop, the apparatus 100 is then unconnected from a portion of the vehicle, such as sun visor or the vehicle dashboard, vehicle doors, vehicle side pillars, vehicle seats or vehicle sunroof. The apparatus 100 is then retracted from a portion of the vehicle 220, such as a sun visor, vehicle headliner, vehicle visor connectors, vehicle visor brackets, vehicle windows, vehicle dashboard, vehicle side pillars, vehicle doors, vehicle sunroof and connected onto vehicle window by hook, string, button, rail, adhesive, tape, glue, pin, clamp, snap, zip, slide, glue, magnet, extension, band, bands, connector, tack, switch, lever, rail, suction, or suction system. The vehicle window 220 may then be rolled up (or electronically moved up, or closed) while allowing the officer to obtain the identification documents (e.g., license, registration, proof of insurance, and/or any other permits) by removing the documents from their labeled area. The apparatus 100 may also allow the officer, upon returning back to the vehicle 220, to attach a potential citation being issued to the apparatus 100 (e.g., by a clamp, hook, clip, pin, adhesive, button, snap, zip, slide, pocket, sleeves, string, bottle, bag, pouch, envelope, wood, plastic, glass, Styrofoam, plexi-glass, tape, glue, magnet, extension, band, bands, connector, tack, switch, lever, suction, suction system, or rail). The apparatus 100 may then be removed from the vehicle window 200 by the operator of the vehicle 220. The apparatus 100 may then be reconnected (or secured) to the vehicle 220 by the operator.

In a typical traffic stop, the apparatus 100 may be used to identifying a person operating the vehicle 220. The operator may load a plurality of physical identification documents into one or more of a plurality of pouches 106*a*-106*n* connected to the plate 102. The plate 102 may have a top, a bottom, a front face, and a back face. The plate 102 may be secured to the glass window 200 of a vehicle 220 by the operator prior to a law enforcement personnel approaching the vehicle 220. The law enforcement personnel may remove the physical identification documents from the plurality of pouches 106*a*-106*n* for inspection. The law enforcement personnel may then replace the physical identification documents after the inspection. The apparatus 100 may allow the physical identification documents to be presented during a traffic stop without the need for an operator of the vehicle 200 to verbally and/or physically interact with the law enforcement personnel.

In a traditional traffic stop, a police officer is generally accustomed to speaking with a vehicle operator. The apparatus 100 and/or 100' may be uncomfortable for the police officer as the apparatus 100 and/or 100' is initially being implemented. However, after the apparatus 100 and/or 100' gains recognition with the police community, such police officers are expected to embrace the apparatus. The police officer can fulfill his duties of verifying that a vehicle driver has the proper identification and/or paperwork, while minimizing physical talking and/or interactions. The police officer will have the proper documentation necessary to either issue a traffic violation, or simply present a warning to a driver in a polite fashion that is sufficiently legal to satisfy the requirements of a traffic stop. The apparatus 100 and/or 100' is expected to be beneficial to both the police community and the drivers of vehicles.

In an alternate implementation, the apparatus 100 may be removable from the vehicle 220. For example, rather than being clipped onto the window 200, the apparatus 100 may be secured to the window 200 with a fastening device, such as a magnet, hook and loop fastener, or other removable type fastener. An officer may be able to remove the entire apparatus 100 from the vehicle 220. In another implementation, the apparatus 100 may be used to project an image of the identification documents onto the window 200. In such an implementation, the apparatus 100 may have a power supply connected to the vehicle 220. With the identification documents projected on the window 200, an officer may either copy the information into his system, or electronically scan the information. For example, the officer may have some sort of a handheld device that may be used to either scan, or create an image of the identification documents projected on the window 200. In another example, the video captured by the camera 150 may be transmitted to a cloud storage device. By transmitting the video to a cloud storage device, the video of the traffic stop may be more securely stored. Such storage may be particularly advantageous if the apparatus 100 gets damaged during the traffic stop. While the term police officer has been used, any law enforcement personnel, officer, security guard, etc. may retrieve information from the apparatus 100. While an operator of a vehicle has been described, such an operator may include a driver, or even a passenger of a vehicle. A vehicle may refer to a car, truck, or other vehicle that operates on a road that is subject to a traffic stop.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
 a plate having a top, a bottom, a front face, a hole and a back face;
 a securing mechanism connected to said top of said plate, said securing mechanism configured to attach to a glass window of a vehicle; and
 a plurality of pouches connected to said front face; wherein
  (i) said pouches are configured to hold physical identification documents,
  (ii) said plate is configured to rest flush with said glass window when said glass window is rolled up,
  (iii) said apparatus allows said physical identification documents to be presented during a traffic stop without the need to verbally and physically interact with a police officer
  (iv) said hole is configured to allow a camera to capture video images, and
  (v) said camera is mounted on said back face of said plate.

2. The apparatus according to claim 1, wherein said camera is configured to capture said video without a subject of said video recognizing the camera is being used.

3. The apparatus according to claim 2, wherein video images captured from said camera are transmitted via a wireless signal to a device in an automobile.

4. The apparatus according to claim 1, wherein said plurality of pouches are configured to display said physical identification documents with individual labels to a traffic officer enable said physical identification documents to be shown without verbal interaction with a driver.

5. The apparatus according to claim 1, wherein said plurality of pouches are configured to be exposed outside of said glass window to enable said physical identification documents to be physically removed and replaced by a traffic officer without physical interaction with a driver.

6. The apparatus according to claim 1, wherein said apparatus further comprises a band configured to attach the apparatus to the vehicle.

7. The apparatus according to claim 6, wherein the band is configured to stretch around a sun visor of the vehicle.

8. The apparatus according to claim 1, wherein said apparatus further comprises a clip configured to allow said police officer to attach a violation to said apparatus without verbally interacting with an operator of said vehicle.

9. A method for identifying a person operating a vehicle during a traffic stop, comprising the steps of:
 (A) loading a plurality of physical identification documents into one or more of a plurality of pouches connected to a plate having a top, a bottom, a front face, a hole and a back face;
 (B) securing said top of said plate to a glass window of a vehicle prior to a law enforcement personnel approaching the vehicle;
 (C) removing said physical identification documents from said plurality of pouches for inspection; and
 (D) replacing said physical identification documents after inspection, wherein (i) said hole is configured to allow a camera to capture video images and (ii) said camera is mounted on said back face of said plate.

10. The method according to claim 9, wherein:
said pouches are configured to hold said physical identification documents.

11. The method according to claim 9, wherein:
said plate is configured to rest flush with said glass window when said glass window is rolled up.

12. The method according to claim 9, wherein:
said plurality of pouches comprise individual labels to enable said physical identification documents to be presented during a traffic stop without the need to verbally and physically interact with a law enforcement personnel.

* * * * *